Jan. 20, 1970   E. W. SCHELLENTRAGER   3,490,554
WEDGE-ADJUSTABLE BALL MOUNTING FOR ELECTRONIC LOAD CELL
Filed March 7, 1969                     2 Sheets-Sheet 1

INVENTOR
EUGENE W. SCHELLENTRAGER
BY

ATTORNEYS

Jan. 20, 1970   E. W. SCHELLENTRAGER   3,490,554
WEDGE-ADJUSTABLE BALL MOUNTING FOR ELECTRONIC LOAD CELL
Filed March 7, 1969   2 Sheets-Sheet 2

INVENTOR
EUGENE W. SCHELLENTRAGER
BY

Baldwin, Egan, Welling & Fetzer
ATTORNEYS

United States Patent Office 3,490,554
Patented Jan. 20, 1970

3,490,554
WEDGE-ADJUSTABLE BALL MOUNTING FOR ELECTRONIC LOAD CELL
Eugene W. Schellentrager, Shaker Heights, Ohio, assignor to The Atlas Bolt & Screw Company, Cleveland, Ohio, a corporation of Ohio
Filed Mar. 7, 1969, Ser. No. 805,322
Int. Cl. G01g 21/22
U.S. Cl. 177—253                5 Claims

ABSTRACT OF THE DISCLOSURE

In a weighing apparatus having a weighbridge for supporting a load to be weighed and a base member below it, a rectangular stabilizing frame is disposed between the weighbridge and the base member with a load cell at each corner of the rectangular frame. A novel adjustment is provided for one or more of the load cells so as to provide that each cell supports its distributive share of the load. One end of such novel load cell rests upon a ball aligned along vertical center lines of the cell, which ball in turn rests upon a seat which has a lower surface inclined to the horizontal and a wedge-shaped adjusting member coacting with the inclined face is adjustable within very close tolerances by means of a bolt threaded into a fixed housing so that adjustment of the wedge-shape member will increase or decrease the load supported by that particular cell.

---

An object of the present invention is to provide a mounting for a plurality of load cells in a weighing apparatus of the type described wherein the cells are maintained in a perfectly vertical position when the apparatus is in use, while providing a simple and easy means of adjusting a load cell to very close tolerances, not requiring the removal of the load cell from the stabilizing frame but merely requiring an ordinary wrench adjustment of the position of the bolt which controls the adjusting wedge.

Other objects and advantages of the invention will be apparent from the accompanying drawings and description and the essential features will be set forth in the appended claims.

In the drawings,

FIG. 2 is a view of one of the load cells of this invention taken along the line 2—2 of FIG. 1 and enlarged; while

Figure 1:
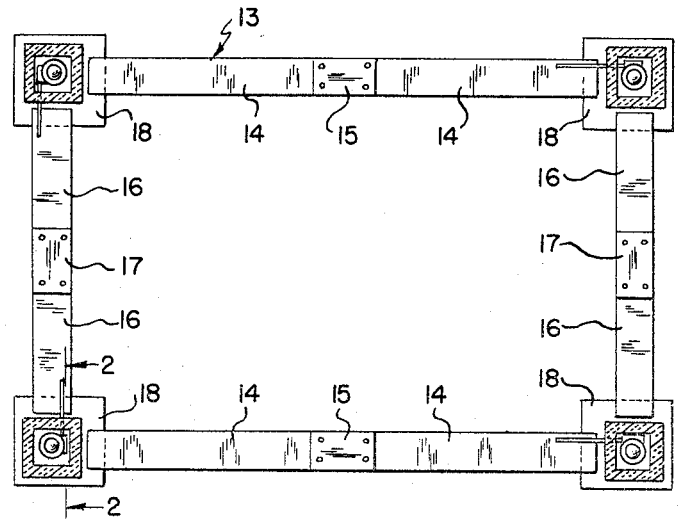
FIG. 1 is a top plan view of a rectangular stabilizing frame for holding four load cells in position between the weighbridge and the base member.
Figure 2:
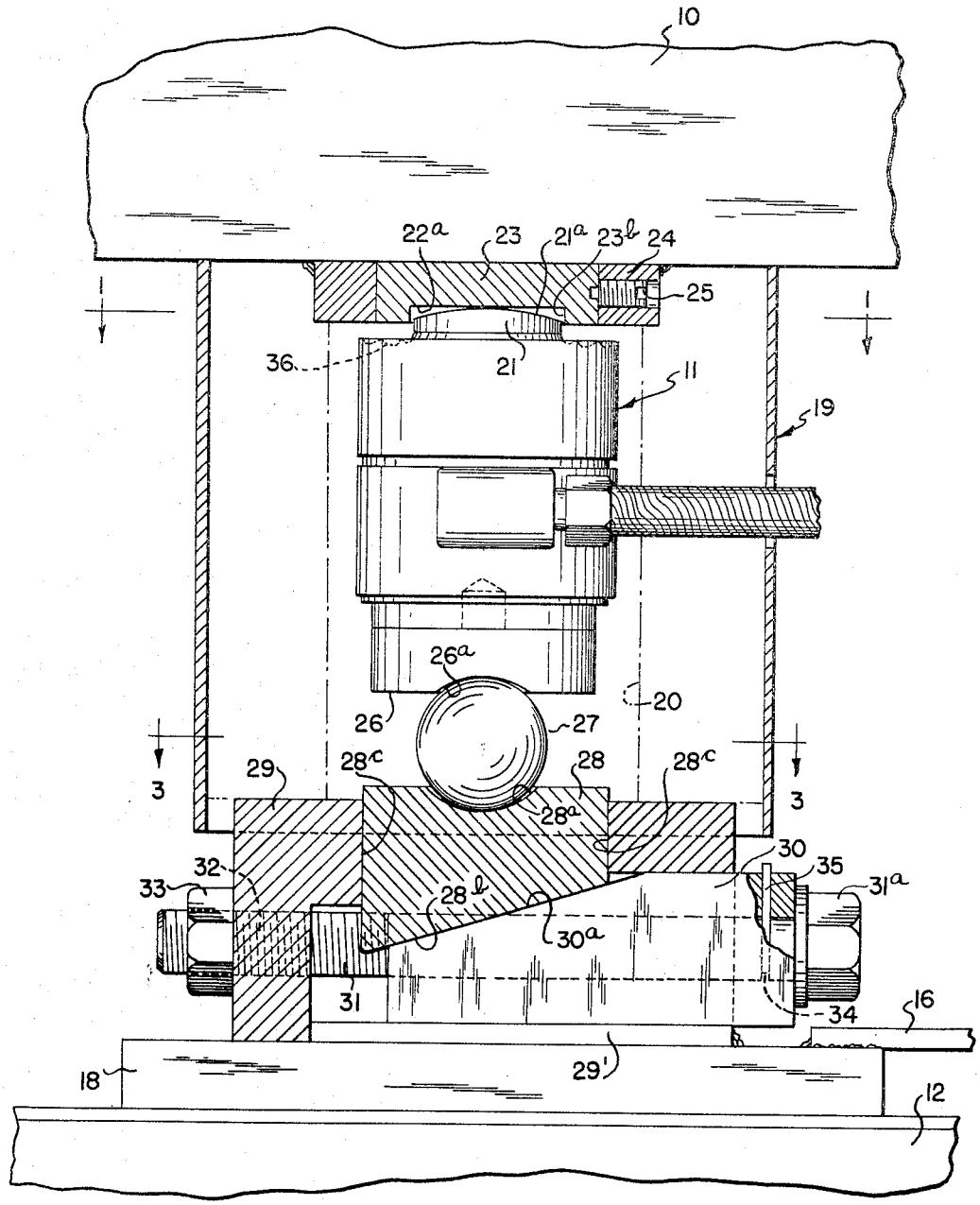

Referring to FIG. 2, a weighbridge 10, arranged as desired for support of a load to be weighed, is supported by a plurality of load cells 11 upon a fixed base 12. The load cells are supported by a generally rectangular stabilizing frame shown in FIG. 1 and generally designated by reference number 13. This frame comprises generally longitudinally extending checking bars 14 rigidly supported by a support member 15 on each side, these support members being rigidly secured to weighbridge 10 in any suitable manner such as by bolts or welding. In a similar manner, check bars 16 at opposite ends of the frame are rigidly secured symmetrically about support members 17 which are rigidly fixed to weighbridge 10 in the same manner as support members 15. Each corner of the stabilizing frame, comprising a distal end of a check bar 14 and a distal end of a check bar 16, is joined by a corner plate 18 as shown in FIG. 2. The check bars 14 and 16 are preferably flat plates of steel of such thickness that their own weight over the distance of their span will cause a downward deflection at the ends of the bars which is in excess of the vertical movement of the associated load cells. Thus, there is no possibility that the check bars will afford any resistance to downward movement of the weighbridge so as to cause any faulty reading during the weighing operation. There is sufficient clearance between support members 15 and 17 and the base member 17, when the load is on the weighbridge, that these support members carry no load but all of the load is carried by the cells 11.

The load cells 11 may be of any suitable kind such as those employing electrical resistance type strain gauges. A number of this type of load cells are commercially available and are presently in common use.

Each load cell 11 is part of an assembly involving the load cell itself encased in a shell 19. The shell may be lined with thermal insulation 20 if desired to maintain a stabilized temperature within the cell assembly. Each cell has an upwardly directed, diametrically reduced weighing column 21. This column has an upwardly convex, partially spherical upper surface 21a engaging a flat or spherical surface 22a of a seat or washer 23 which fits snugly in a ring 24 welded to the weighbridge 10. The parts 23 and 24 are held fixed relative to each other by one or more set screws 25.

Figure 3:
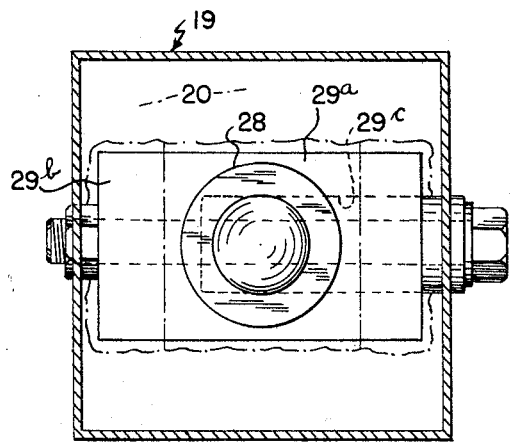
FIG. 3 is a sectional view taken along the line 3—3 of FIG. 2 on a somewhat smaller scale.

The load cell has a lower horizontal flat face 26 having a partially spherical seat or recess 26a concentric with the vertical center line of the cell 11. A stainless steel ball 27 is positioned in the recess 26a at the upper side and has its lower end seated in a partially spherical recess 28a in a second bearing seat 28. The seat 28 may be square, rectangular or circular in section but is shown in FIG. 3 as being cylindrical. The seat 28 is vertically reciprocable by means of a snug fit in a through opening in the top wall of a housing 29 which has side walls 29a and an end wall 29b which are welded at their lower ends to the corner plate 18. The housing has a hollow recess 29c in which is mounted for horizontal movement an adjusting wedge 30. This wedge is slidable upon a base plate 29' which forms the bottom of the recess 29c and which is welded to the corner plate 18.

The lower face of the seat 28 is inclined as shown at 28b which coacts with the inclined face 30a of the adjusting wedge 30 which is inclined at the same angle as the face 28b. Means is provided for power movement of the wedge 30 toward the left as viewed in FIG. 2. In this embodiment, this is provided by a bolt 31 which passes freely through a receiving opening extending longitudinally of the wedge 30. At its right-hand end, the bolt has a head 31a engaging against the vertical face of the wedge 30. At its left-hand end, the bolt is provided with threads which engage coacting threads 32 in the end wall of the housing 29. In any adjusted position of the wedge 30, the bolt is held in position by a nut 33 at the left-hand end of the bolt. Means may be provided so that the bolt will positively move the wedge 30 toward the right in FIG. 2 and this is here shown as an annular groove 34 in the bolt 31 which receives a washer 35 held in a suitable slot in the wedge 30. Thus, when the bolt is turned in the threads 32 to move toward the right in FIG. 2, it will carry the wedge 30 with it.

The inclination of the coacting inclined faces 28b and 30a is exaggerated in FIG. 2 to illustrate the purpose of these surfaces. If the wedge arrangement is to be used to bring the low cell of the system of cells into proper bearing with the others, when there is no load or a very light load on the weighbridge 10, then it would not be necessary to exert great force to move the seat 28 upwardly. In this case, the steeper angle as shown in FIG. 2 would allow the adjustment to be made more easily and quickly than if a flatter angle were used between the wedge and the seat 28. On the other hand, if the change in adjustment is necessary at a time when the load cell system is loaded, then it would appear that a much lesser angle of the inclined surfaces 28b and 30a would be appropriate. In actual use, it is expected that an adjustment in the order of fifteen- or twenty-thousandths of an inch would be ample, but it is believed that the arrangement of the parts should provide at least ⅛ inch total vertical rise. It is important that this device be made as rust free as possible, so that an adjustment can be made easily when necessary. It will be understood that such adjustment might be made at a relatively long time after the initial installation. To this end, the bearing seat 22a is hard chrome plate as is also the case with the ball seat 28, including its inclined face 28b, and the adjusting wedge 30. The ball 27, the bolt 31 and the nut 33 are preferably of stainless steel.

It should be understood that all four of the load cells shown in FIG. 1 might be provided with an adjustable wedge 30 as shown in FIG. 2. However, it is believed that this would not be necessary in an actual system where it is believed that two of these improved load cells might be provided diagonally opposite each other while the other two load cells were of a less complicated structure.

A great merit of the present invention is the ability to hold the load cell in a perfectly vertical position. To this end, the vertically extending faces 28c where the ballseat 28 meets the housing 29 are of sufficient vertical extent to maintain a true vertical movement of the seat 28 as it is adjusted vertically by means of the wedge 30 as previously described. This, together with the mounting of the load cells on the stabilizing frame 13 assures that there is no lateral load on the cells. The importance of this will be understood if it is realized that the common load cell in use today has a corrugated seal indicated in dotted lines at 36 in FIG. 2 which provides a resilient seal between the weighing column 21 and the outer wall of the load cell 11. Any lateral load on the cell runs the risk of breaking this seal 36 which would permit moisture to enter the cell which would be very disadvantageous.

One of the applications of this invention is in a metallurgical process involving the transportation of hot metal in cars. These cars must be weighed quickly to avoid complications in the handling of the hot metal. Therefore, it will be understood that a great advantage of this improved wedge adjustment is that it provides an adjustment which may be made quickly and easily without necessitating the removal of a load cell from its position in the stabilizing frame and calls only for an ordinary wrench.

What is claimed is:

1. In a weighing apparatus having a weighbridge member for supportng a load to be weighed and a base member therebelow, and in which a plurality of load cell assemblies are arranged each having a load cell operatively positioned between said weighbridge member and said base member so that each cell assembly supports its distributive share of a load; the combination therewith of at least one of said cell assemblies comprising a first bearing seat fixed to one of said members, said one cell assembly having a vertically extending load bearing column engaging said first bearing seat, said first bearing seat and said column having mutually engaging surfaces one of which is partly spherical providing substantially point contact along the vertical center line of said one load cell, said one cell assembly comprising a second bearing seat and a housing snugly embracing and supporting said second seat for controlled vertical movement in said housing, said housing fixed to the other of said members, said second bearing seat and said load cell having mutually facing partly spherical recesses, a ball bearing engaged between said recesses on said vertical center line, said second bearing seat having a face inclined to the horizontal on the side opposite said ball bearing, an adjusting wedge slidably engaged between said inclined face and said other member, said wedge having a face complementary to and engaging against said inclined face, and power means for moving said wedge to vary the vertical position of said second bearing seat and to maintain its position.

2. A weighing apparatus as defined in claim 1, wherein said second bearing seat is cylindrical.

3. A weighing apparatus as defined in claim 1, wherein said power means is a bolt freely passing horizontally through said wedge and having a threaded connection with said housing, said bolt having a head engaging said wedge.

4. A weighing apparatus as defined in claim 3, including means preventing relative longitudinal movement between said bolt and said wedge, while permitting rotation of said bolt about its axis.

5. A weighing apparatus as defined in claim 1, including a rectangular stabilizing frame disposed between said weighbridge member and said base member, said frame comprising four elongated check bars, support means rigidly connecting an intermediate portion of each check bar to said weighbridge member, corner plates connecting adjacent pairs of said check bars, said load cell assemblies being mounted one on the upper surface of each of said corner plates and extending upwardly therefrom to said weighbridge, the lower surfaces of said corner plates engaging said base member, and said check bars being flexible in such a manner as to allow substantially vertical movement only of said corner plates.

References Cited

UNITED STATES PATENTS

| | | | |
|---|---|---|---|
| 2,313,509 | 3/1943 | Bohannan | 177—254 XR |
| 2,395,784 | 2/1946 | Honegger | 177—253 XR |
| 2,646,271 | 7/1953 | Williams | 177—261 XR |
| 3,072,209 | 1/1963 | Perry | 177—211 XR |
| 3,123,166 | 3/1964 | Schellentrager | 177—211 |

FOREIGN PATENTS 865,543   2/1953   Germany.

ROBERT S. WARD, Jr., Primary Examiner

U.S. Cl. X.R.

177—211, 261